Feb. 12, 1929.
O. W. THOMPSON
GAUGE
Filed Aug. 13, 1920    2 Sheets-Sheet 1
1,701,735
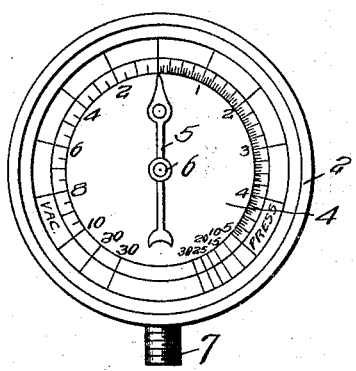
Fig. 1.
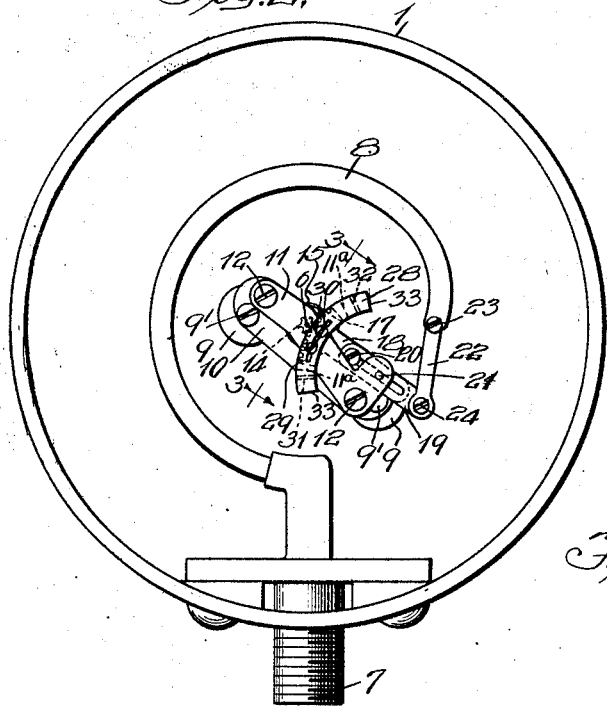
Fig. 2.
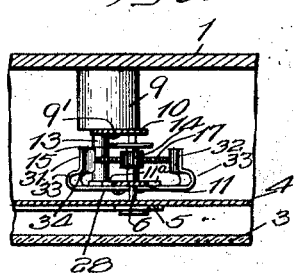
Fig. 3.
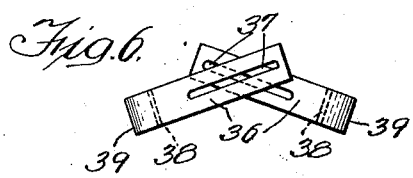
Fig. 6.
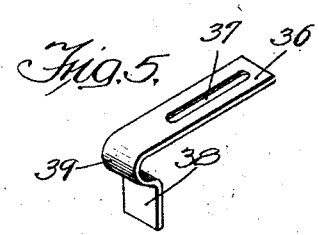
Fig. 5.
Fig. 4.
Witnesses:
W. F. Kilroy
Harry R. L. White
Inventor
Orville W. Thompson
By Hill & Hill Attys

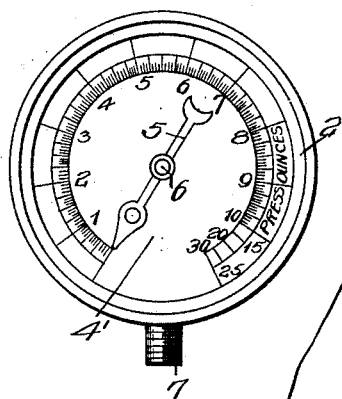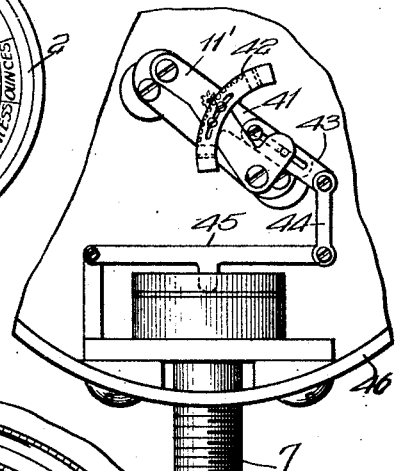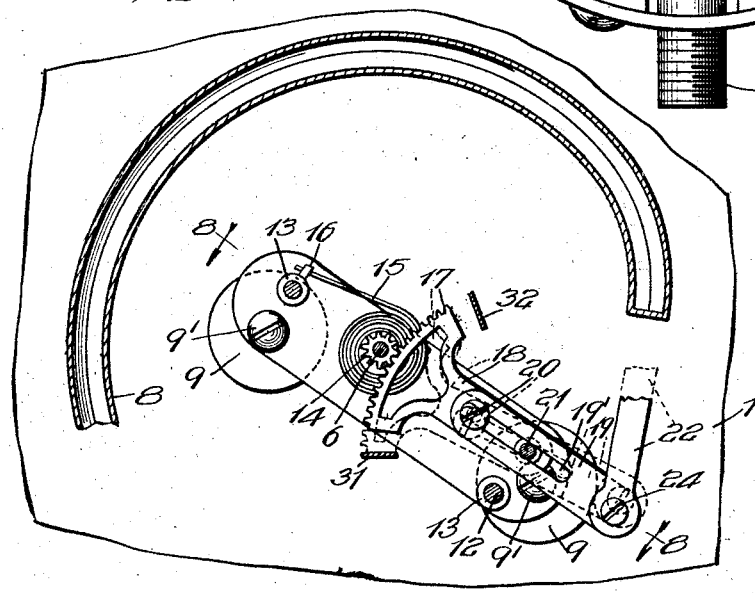

Patented Feb. 12, 1929.

1,701,735

UNITED STATES PATENT OFFICE.

ORVILLE W. THOMPSON, OF CHICAGO, ILLINOIS.

GAUGE.

Application filed August 13, 1920. Serial No. 403,291.

My invention belongs to that general class of devices known as gauges, and particularly a gauge suitable for accurate readings for a desired range, as for example, on a pressure or vacuum system. It may be mentioned, however, that its use is not limited to a gauge for low or high readings, and that the same may be applied to a gauge arranged for indicating vacuum, for example, in inches, as well as for both pressure and vacuum, as is illustrated in the drawings. The invention has primarily as an object the production of a gauge of the kind described for use normally within certain limits, but which in case the pressure, or for that matter the vacuum depending on the type of gauge exceeds the pressure or vacuum intended as the normal limit, there will be no injury to any of the gauge mechanisms by an abnormal increase. This permits a construction in which fine or close readings may be indicated. The invention has among its further objects the production of a device of the kind described that is simple, convenient, durable, compact, efficient and satisfactory for use wherever found applicable. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Figure 1 is a front view of one form of my gauge;

Figure 2 is a plan view of the same with the dial, pointer and glass front removed;

Figure 3 is a sectional view taken substantially on line 3—3 of Figure 2;

Figure 4 is a perspective view of the yielding stop member 28 shown in Figures 2 and 3;

Figure 5 is a perspective view of a one-way stop member corresponding to the stop shown in Figure 4;

Figure 6 is a view in elevation of two stops similar to that shown in Figure 5, combined to produce a stop similar to that shown in Figure 4;

Figure 7 is an enlarged view similar to a portion of Figure 2, with portions removed and a portion in section;

Figure 8 is a sectional view taken substantially on line 8—8 of Figure 7;

Figure 9 is a view similar to Figure 1 of a slightly different construction embodying a single stop; and Fig. 10 is a fragmentary view similar to Fig. 2 wherein I have shown a modified form of pressure indicating actuating means.

Referring to the drawings, it may be mentioned that I have particularly illustrated a gauge employing the well known type of Bourdon spring, this, however, being for purposes of illustration, as any equivalent, such as a diaphragm construction shown in Figure 10, piston, or other types of mechanism for the same purpose and well known in the art, may be employed. The casing 1 is of suitable size, shape and material, having the face side preferably open and covered with a glass cover 3 which may be maintained in place by a flanged ring 2 or the equivalent for the purpose. Arranged on the inner side of the glass, but spaced therefrom to permit the positioning of the indicating pointer 5 or its equivalent, and arranged to cooperate therewith, is a dial 4 which has the desired gradations thereon, depending upon the use in which the gauge is to be employed. In the construction shown, the indicator 5 is in the form of a pointer or arrow and mounted on a shaft 6, which is operatively connected with the pressure actuated mechanism or vacuum actuated mechanism, as the case may be.

As before mentioned, in the type of gauge shown I have shown for purposes of illustration a Bourdon spring 8, which by means of the pipe 7 is operatively connected in the system. The casing, as shown, is provided with one or more posts 9, which carry spaced plates 10 and 11. As illustrated, plates 10 and 11 are secured together by the screw or bolt 12 and maintained in spaced relation by the sleeves 13, the same constituting what may be termed the movement mechanism frame, which may be assembled with the mechanism to be described and secured on the posts 9 by screws 9' or equivalent means for the purpose. Mounted on the shaft 6 is a pinion 14. Movement of the pinion 14 is normally opposed by a spring 15 having one end secured to the shaft 6 and the other end anchored, as for example at 16, to the post 13. The spring 15 not only cooperates with the other mechanism in returning the indicator to starting or zero position, but by yieldingly opposing its movement, tends to make the instrument steadier and prevent vibration or fluctuation of the indicator. The pinion 14 is actuated or controlled by means of a gear sector 17, which is operatively connected with the pressure or vacuum controlled mechanism, in the case illustrated the Bourdon spring 8. As shown, the sector is provided with an extending portion 18 which is mounted on a link 19 operatively connected by means of a link 22 with the Bourdon spring or its equivalent. As shown, 21 is a pivot pin which projects through the arm 18, to which is adjustably secured the link 19 which is provided with a slot 19', so that the length of the complete arm or lever 18—19 may be varied as desired. The two arms are secured together by means of a screw 20 or equivalent means, so that when the instrument is adjusted as desired, the two parts may be substantially rigidly secured together. In the construction shown, link 22 is pivotally secured at 23 and 24 to the Bourdon spring and to the arm 19, so that as the Bourdon spring is actuated, it tends to move the sector 17 which transmits movement to the pinion 14, thereby actuating the indicator so as to indicate the movement of the Bourdon spring or its equivalent, thereby showing the pressure in ounces, pounds or the like, or vacuum.

Frequently, the pressure in the system or the vacuum, as the case may be, may be greater than normal, and in this case if the same is greatly in excess of the capacity of the gauge for which the same is designed, there is a tendancy to possibly injure the mechanism or to move the sector a distance where it will disengage with the pinion. In order to limit the movement of the sector and prevent disengagement of the parts, as well as to prevent injury to the gauge parts, I provide a resilient stop or stops. With the type of gauge shown in Figure 1 I provide a stop which will become operative after a predetermined movement of the indicator in either direction, but which will nevertheless yield to a certain extent and prevent injury to the parts. In the combined pressure and vacuum gauge construction, I employ a resilient stop 28, having ends 31 and 32 arranged in the path of the gear sector 17. As shown, the stop is mounted on the frame bar 11, it being understood, however, that it may be supported in any suitable manner. As shown, the same is provided with the slot 29 and secured in place by screws 30 so that the same may be adjusted to the desired extent. Referring particularly to Figure 4, I prefer to make the member 28 with a double backward bend as indicated at 33 and 34, so as to avoid comparatively sharp bends, as well as to improve the resilient action. The construction as illustrated Figure 4 of the drawings comprises a main arcuate shaped flat strip part with upturned or backwardly bent substantially semi-circular shaped end portions 33, 34 and straight portions 31, 32. Where it is only desired to provide the stop to oppose the movement of the sector in only one direction, the stop may be constructed as shown in Figure 5, in which the part 36 may be slotted as at 37 or formed in an equivalent manner, so that the same may be secured in place, the same being bent as at 39 to provide the stop portion 38. I have shown in Figure 6 how a double stop may be provided by combining two of the members 36, the same being preferably formed so that they may be adjusted as desired. In Figure 7 the stops 31—32 are so arranged that in a combined vacuum and pressure gauge, as shown in Figure 1, the pointer may move a predetermined distance in either direction before its further movement is yieldingly opposed by the supplemental spring. With the type of gauge shown in Figure 9, however, a stop similar to that shown in Figure 5 may be employed to take the place of the stop part 31, or a spring similar to that shown in Figure 4 may be arranged, with the same so designed that when the indicator registers zero or is at its neutral position, the sector 17 will engage with 32 so that the pointer is brought exactly back to zero or neutral point. The same results may be obtained by using the two springs 36, as shown in Figure 6.

With the gauge shown in Figure 1, it is designed for five pound pressure, the ounces being indicated. When the pressure reaches five pounds the sector 17 will have engaged with the stop 31, so that in case of increased pressure, the spring 15 will be supplemented in its movement and the sector 17 prevented from moving a distance to disengage with the pinion, and injury to the gauge will be avoided. In case of a vacuum greater than ten pounds for example, the same action will take place when the gear sector engages with the stop 32. If desired, additional gradations may be added to the dial, as shown, so that the pressure greater than five pounds may be noted, should this be desired, as may be also additional vacuum gradations. However, normally the gauge indicator does not travel greater than five pounds, but in case the same does, no injury will result to the mechanism, nor will the same be thrown out of adjustment. The operation of the pressure gauge shown in Figure 9 is similar and will be readily understood from the preceding.

Referring to Figure 10, I have shown the application of the construction to a diaphragm type of gauge, it being understood that the diaphragm mechanism itself is not shown in detail as it forms no part of the present invention, except as a pressure actuated or like element. In this figure, 11' corresponds to the bar or frame part 11, shown in the other figures, 41 being the sector, 42 the yielding stop, 43 a sector arm and 44 a link connecting the arm with a diaphragm controlled arm 45, the mechanism ordinarily being placed in the casing 46. In this construction as the diaphragm is actuated by pressure or vacuum it controls lever 45 thereby actuating the indicating mechanism substantially similar to the actuation of the same by the Bourdon spring as previously described.

It should be noted that the gauge may be constructed to operate under any desired pressure or vacuum, this depending upon the strength or design of the Bourdon spring, diaphragm or other pressure controlled mechanism, or vacuum controlled mechanism, the dial of course being designed to correspond. The auxiliary stop mechanism may be made of the desired size and strength so as to produce the desired results. It will be noted that, as before mentioned, it is immaterial as to the type of actuating mechanism employed, as my construction is applicable for a diaphragm or plunger type of gauge as well as that shown. The construction substantially permits all movements to be standardized, as the resilient stop may be varied as found desirable, as may also be the Bourdon tube, or its equivalent. The device is particularly convenient in assembling as the same may be made up as a part of the movement, or may be readily applied to the same at any time or to gauges not equipped. While I ordinarily prefer to make the resilient stop so that it may be adjustably secured to the bar or other support, obviously the same may be soldered or otherwise secured thereto.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a gauge of the kind described, and in combination, indicating mechanism, a fluid controlled member, means for operatively connecting the same and transmitting movement from the said member to the indicating mechanism including a movement frame bar, a pinion connected with the indicating mechanism, a gear sector mounted on the frame bar to actuate said pinion and operatively connected with said member, and a spring to engage with and retard said gear sector after an initial movement thereof, said spring consisting of a flat strip disposed face wise relatively to and secured intermediate its ends to the frame bar, and said strip having a resilient upturned portion at either end thereof extending at an angle to the central portion to points in the path of movement of the gear sector.

2. In a gauge of the kind described, and in combination, indicating mechanism, a fluid controlled member, means for operatively connecting the same and transmitting movement from the said member to the indicating mechanism including a movement frame bar, a pinion connected with the indicating mechanism, a gear sector mounted on the frame bar to actuate said pinion and operatively connected with said member, and means to engage with and retard said gear sector after an initial movement thereof, said means consisting of a main arcuate shaped flat strip part disposed face wise relatively to and secured intermediate its ends to the frame bar, said main arcuate shaped strip part having a resilient portion at either end thereof extending at an angle thereto to points in the path of movement of the sector.

3. In a gauge of the kind described and in combination, indicating mechanism, a fluid controlled member, and means for operatively connecting the same and transmitting movement from the said member to the indicating mechanism including a movement frame bar, a pinion connected with the indicating mechanism, a gear sector mounted on the frame bar to actuate said pinion and operatively connected with said member, and a spring to engage with and retard said gear sector after an initial movement thereof, said spring consisting of a flat strip having an elongated slot in the central portion thereof and a resilient upturned part at either end thereof extending at an angle to the central portion to points in the path of movement of the sector, and means for adjustably securing the flat strip to said frame bar, said last mentioned means including a clamp screw adapted to extend through said elongated slot and enter the frame bar.

4. In a gauge of the kind described, and in combination, indicating mechanism, a fluid controlled member, means for operatively connecting the same and transmitting movement from the said member to the indicating mechanism including a movement frame bar, a pinion connected with the indicating mechanism, a gear sector mounted on the frame bar to actuate said pinion and operatively connected with said member, and means to engage with and retard said gear sector after an initial movement thereof, said means including a main arcuate shaped flat strip section secured to the frame bar and having at one end a resilient-semicircular backwardly curved portion extending to one side of the plane thereof and terminating in a straight end part extending at an angle to the main arcuate shaped strip section to a point in the path of movement of the gear sector.

In testimony whereof, I have hereunto signed my name.

ORVILLE W. THOMPSON.